Nov. 10, 1959 W. H. DU SHANE 2,912,257
HITCH DEVICES
Filed Sept. 9, 1955 3 Sheets-Sheet 1
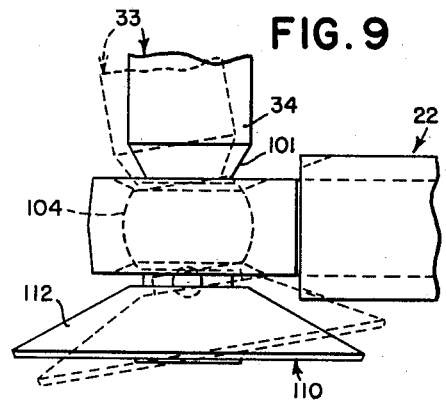
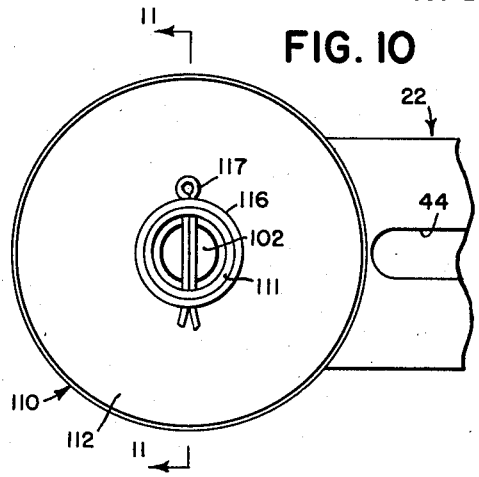
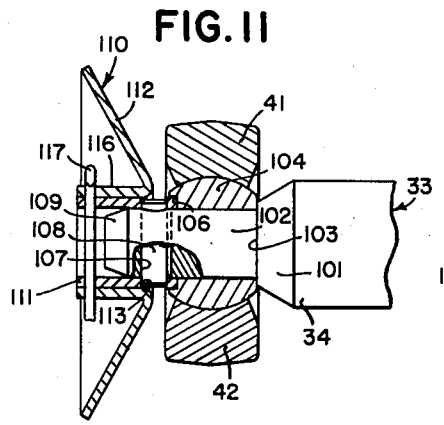
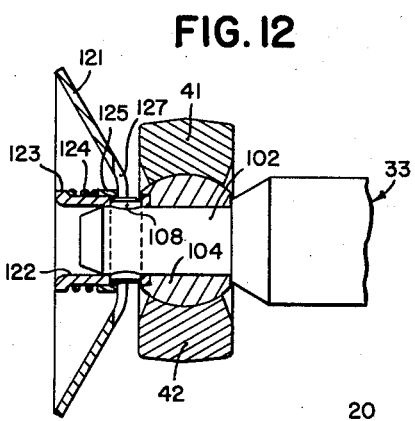
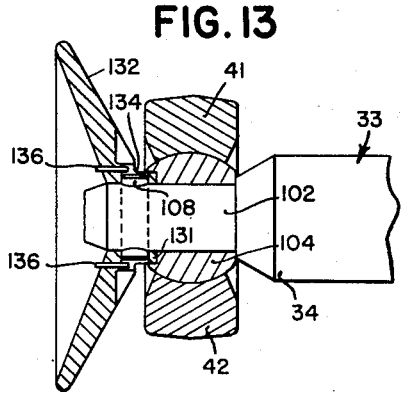
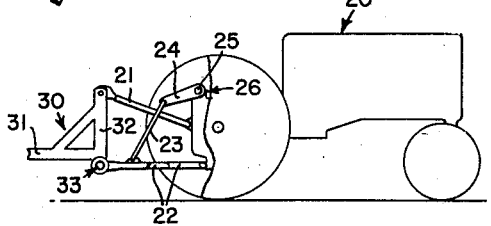
INVENTOR.
WALLACE H. DU SHANE
BY
ATTORNEYS Nov. 10, 1959   W. H. DU SHANE   2,912,257
HITCH DEVICES
Filed Sept. 9, 1955   3 Sheets-Sheet 2
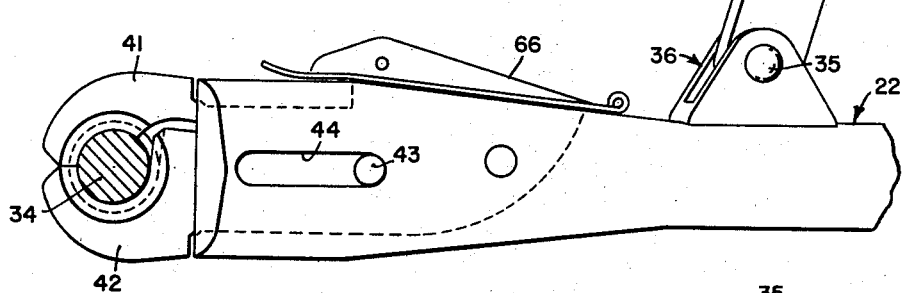
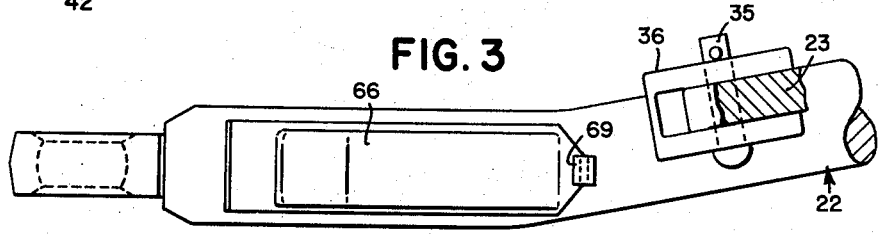
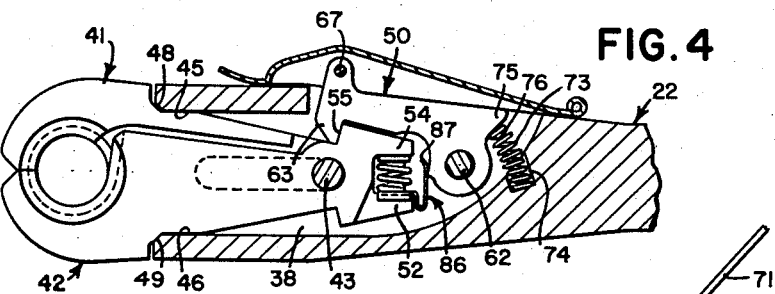
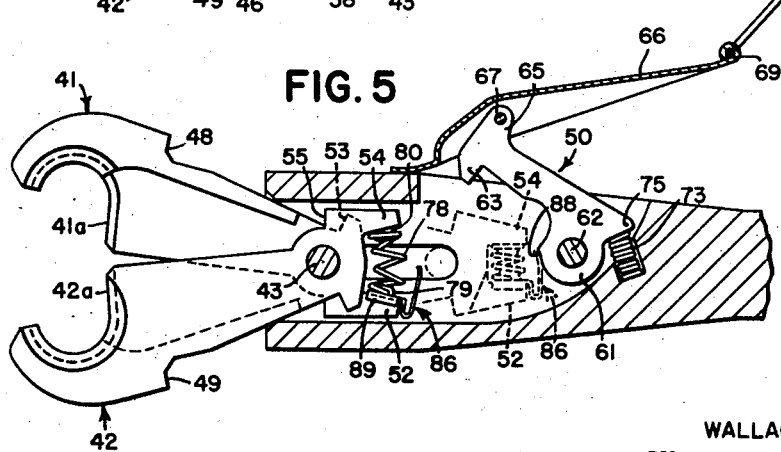
INVENTOR.
WALLACE H. DU SHANE
BY
ATTORNEYS Nov. 10, 1959 W. H. DU SHANE 2,912,257
HITCH DEVICES
Filed Sept. 9, 1955 3 Sheets-Sheet 3
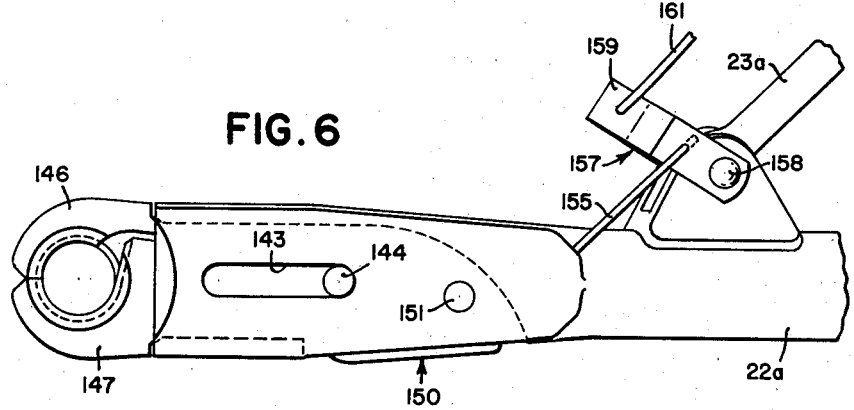
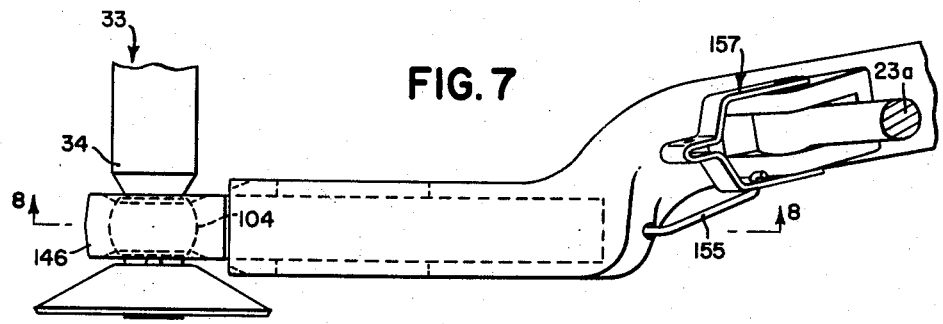
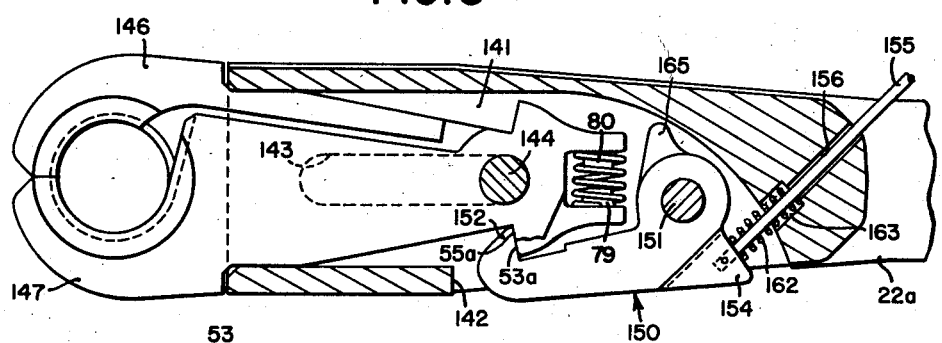
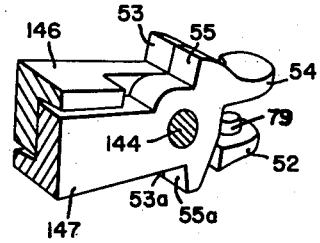
INVENTOR.
WALLACE H. DU SHANE
BY
ATTORNEYS

United States Patent Office 2,912,257
Patented Nov. 10, 1959

2,912,257

HITCH DEVICES

Wallace H. Du Shane, Waterloo, Iowa, assignor, by mesne assignments, to Deere & Company, a corporation of Delaware Application September 9, 1955, Serial No. 533,462

14 Claims. (Cl. 280—460)

The present invention relates generally to agricultural implements and more particularly to quick attachable hitch devices adapted to be incorporated in the connection between a tractor and implement.

The object and general nature of the present invention is the provision of a new and improved quick detachable connection adapted for incorporation in implement hitch means whereby an implement is connected with the tractor to be supported or propelled thereby. More particularly it is a feature of this invention to provide a quick attachable hitch adapted for tractors having a pair of laterally spaced apart hitch links that are carried by the tractor and connected with the tractor power lift to be raised or lowered thereby, whereby, according to the principles of the present invention, the tractor may simply be backed into the implement and automatically connected therewith.

Another feature of this invention is the provision of means in the nature of hitch links having implement-engaging jaws that are movable generally fore-and-aft relative to the hitch links, with means carried by the links for controlling the opening and closing of the jaws, it being a more specific object of this invention to provide means whereby the jaws may be released one at a time, without requiring that both jaws, or both sets of jaws, be simultaneously released to permit the implement to be driven away from the tractor.

An additional feature of this invention is the provision of means associated with the implement and acting to guide the implement-engaging links when the tractor is backed into position relative to the implement to connect the latter with the tractor.

Still further, another feature of this invention is the provision of new and improved latch means associated with the implement-engaging jaws whereby each pair of pivotally interconnected jaws are provided with means whereby each latch may engage each of the jaws of each pair, thereby distributing the draft pull, transmitted between the implement and the tractor, so that each jaw carries a proportion of the stresses involved.

These and other objects and advantages of the present invention will be apparent to those skilled in the art after a consideration of the following detailed description, taken in conjunction with the accompanying drawings, in which:

Fig. 1 is a fragmentary side view illustrating a tractor and implement outfit in which the hitch means connecting the implement and tractor incorporates quick detachable connections constructed according to the principles of the present invention.

Fig. 2 is an enlarged side view of one of the quick attachable couplings mounted on and incorporated in the tractor draft links.

Fig. 3 is a top view of the structure shown in Fig. 2.

Fig. 4 is a view similar to Fig. 2, with certain parts shown in section, the jaws being illustrated in their implement-connecting, or closed, position.

Fig. 5 is a view similar to Fig. 4, showing the jaws in their open or released position.

Fig. 6 is a view similar to Fig. 2, showing a modified form of jaw construction.

Fig. 7 is a top view of the construction shown in Fig. 6.

Fig. 8 is a sectional view taken generally along the line 8—8 of Fig. 7, certain parts being shown in elevation for purposes of clarity.

Fig. 9 is a fragmentary plan view of the rear portion of a quick attachable jaw construction, incorporating the principles of the present invention, and the associated portion of an implement attaching stud, the latter being shown in two different positions, one in dotted lines, in order to illustrate the guiding function of the conical washers associated with the implement stud.

Fig. 10 is a side view of the part shown in Fig. 9.

Fig. 11 is a sectional view taken generally along the line 11—11 of Fig. 10.

Fig. 12 is a sectional view similar to Fig. 11, showing a modified form of guide means.

Fig. 13 is a sectional view also similar to Fig. 11 and showing another modified form of guide means.

Fig. 14 is a fragmentary detail view, partly in section, of the pivoted ends of the draft link jaws.

Referring first to Fig. 1, the reference numeral 20 indicates a tractor that is more or less of conventional construction, so far as the present invention is concerned, such as one employing the well known three point hitch system, which includes an upper link or compression link 21, a pair of lower draft or tension links 22, said links being connected with the tractor for both vertical and horizontal swinging, the lower links 22 being connected by lift links 23 with lift arms 24 fixed to a rockshaft 25 that forms a part of the power lift system 26 of the tractor 20. The implement is indicated by the reference numeral 30 and, for purposes of illustration, has been shown as a plow including a frame 31 having a forward upwardly extending mast section 32 and, at the lower portion of the mast section 32 a cross shaft 33 the ends of which are arranged as link-receiving attachment studs 34. The plow 30 represents any one of a number of different implements with which the tractor 20 may be connected, and according to the principles of the present invention means is provided for automatically coupling the rear portions of the draft links 22 to the implement studs 34 merely by backing the tractor into position relative to the implement. The means by which the rear ends of the draft links 22 of the tractor can be quickly and automatically connected with the implement 30 forms the principal portion of the present invention and will now be described in detail.

Fig. 2 shows the rear end of one of the two lower draft links 22 that normally form a part of a farm tractor, and each link 22 is provided with quick attachable coupling means that preferably are of identical construction, and hence a description of one will suffice. As shown in Figs. 2–5, each link 22 is connected with an associated lift link 23 by a pivotal connection that includes a pivot 35 and associated apertured lug means 36 that is fixed, as by welding or the like, to the rear portion of the link 22. Rearwardly of the lug or bracket 36 the rear end portion of the draft link 22 is provided with a hollowed out section 38 (Fig. 4) in which a pair of pivotally interconnected jaws 41 and 42 are slidably disposed. The jaws 41 and 42 are interconnected by means of a pivot pin 43, each end of which extends outwardly through a slot 44 cut in the side wall of the rear end portion of the link 22. The interior section 38 of the link 22 is formed so as to present upper and lower abutment sections 45 and 46 between which the interconnected jaws 41 and 42 are disposed, as best shown in Fig. 4, each jaw having a cooperating shouldered section 48 and 49 respectively, the shouldered portions 48 and 49 cooperating with the upper and lower abutting sections 45 and 46 on the rear end of the draft link so that during the transmission of draft forces between the implement and the tractor the tendency for the studs 34, which are conventionally round, and associated parts, to open the jaws is effectively resisted.

As mentioned above, the jaws 41 and 42 are slidable in the link 22, from an open position, shown in Fig. 5, to a closed position, shown in Fig. 4, and vice versa. Latch means 50 is employed for holding the implement-engaging jaws 41 and 42 in their forward or closed position, Fig. 4, so that draft pull may be transmitted from the tractor through the jaws 41 and 42 to the associated implement stud 34 on the implement 30. The inner or forward ends of the jaws 41 and 42 are extended beyond the interconnecting pivot 43 to form spring receiving and latch receiving shoulders. The upper jaw 41 carries a spring receiving shoulder 52 and an upper latch-receiving shoulder 53 (Fig. 5). Similarly, the lower jaw 42 carries an upper spring-receiving shoulder 54 and an upper latch receiving shoulder 55. The shoulders 53 and 55, as best shown in Fig. 14, are disposed in transverse alignment when the jaws are closed whereby both shoulders 53 and 55 are adapted to be engaged by the latch member 50 when the parts are arranged as shown in Fig. 4.

The latch 50 comprises a member having a forward lower section 61 apertured to receive a cross pivot 62. The rear end of the latch 50 includes a transversely extending detent 63 that has a forward face adapted to abuttingly engage the two jaw shoulders 53 and 55 when the jaws are closed. An apertured lug 65 is formed on the upper rear end of the latch 50 and receives a handle member 66 that is swingably connected with the latch 50 by a pivot pin 67 or the like. The rear end of the handle 66 bears against the upper face of the rear end of the associated link 22, and the forward end of the handle 66 is provided with a loop 69 by which a cable 71 or the like may be connected therewith. By pulling upwardly on the cable 71, the latch 50 may be raised into a jaw releasing position, shown in full lines in Fig. 5. The latch 50 is resiliently urged toward jaw-engaging position (Fig. 4) by virtue of a spring 73 seated in a recess 74 formed in the body of the link 22 and bearing at its upper end against a spring receiving section 75 of the latch. A projection on the latch section 75 serves to center the upper end of the spring 73. The projection is shown at 76. The two jaws 41 and 42 are biased to move toward their open position, Fig. 5, by means of a spring 78 that is disposed between the spring receiving sections 52 and 54, the spring 78 being held in place by spring-receiving projections 79 and 80 formed on the sections 52 and 54, respectively.

When the parts are arranged as shown in Fig. 4, the latch 50 engaging the shoulders 53 and 55 of the jaws 41 and 42 prevents the latter from moving rearwardly relative to the associated draft link 22, and thus draft can be transmitted from the tractor to the implement. When it is desired to release the implement from the tractor, the operator lifts the handle member 66 up into the position shown in Fig. 5, which raises the abutment section 63 away from the latch engaging faces 53 and 55 on the jaws.

It is desirable to provide means for holding the latch 50 in its jaw-releasing position even though the operator may release his hold on the cable 71. For this purpose, the forward end of the upper jaw 41 carries a spring member 86 having an upwardly extending rounded portion 87 and arranged to bear against a shoulder 88 on the latch 50 when the jaws 41 and 42 are in their retracted or implement-engaging position, as shown in Fig. 4. The spring member 86 is held to the forward end of the jaw 41 in any suitable manner, as by having its base section 89 apertured to receive the projection 79 and adapted to underlie the lower end of the spring 78. As can be seen from Fig. 4, just as soon as the latch 50 is raised to its upper or jaw-releasing position, the upper end portion 87 of the spring 86 snaps underneath the projection 88 on the latch 50, as shown in dotted lines in Fig. 5, and this holds the latch 50 in its uppermost position so long as the jaws 41 and 42 remain in their implement engaging or retracted position. Thus, the operator may release his hold on the cable 71 but the spring 86 will still retain the abutment section 63 away from the jaw shoulders 53 and 55. Thus, the operator can first raise one handle 66 at one side of the tractor and then raise the other handle 66, and then after both handles are raised, the tractor can be driven forwardly and the jaws 41 and 42 will then be drawn outwardly into implement-releasing position, as shown in Fig. 5. As soon as the spring member 86 moves rearwardly away from the projection 88 on the latch 50, the latter is free to swing downwardly again, being urged to do so by the spring 73. Therefore, the position of the latch 50 shown in full lines in Fig. 5 indicates that the operator is holding the latch handle 66 upwardly as by a continued pull on the cable 71. However, until the jaws 41 and 42 are moved rearwardly a distance sufficient to carry the spring 86 away from the projection 88, the spring 86 will hold the latch 50 in the position shown in Fig. 5. The jaws 41 and 42, once they have been moved into their released position are held in that position, Fig. 5, by the action of the spring 78.

With both pairs of jaws 41 and 42 held in their open position the link 21 (Fig. 1) may be disconnected from the mast 32 and the tractor may readily be driven away from the implement. Connecting the tractor to the implement is equally simple. This may be done by backing the tractor so as to engage the rear abutment faces 41a and/or 42a of the open jaws 41 and 42 with the implement studs so that an additional small amount of movement of the tractor relative to the implement will force the jaws into the rear ends of the links 22, the shouldered portions 45, 46 thus causing the jaws 41 and 42 to close around the associated implement studs or other implement-attaching means, and as soon as the jaws 41 and 42 are moved to a position such as that shown in Fig. 4 the latches 50 snap into position over the jaw shoulders 53 and 55, whereupon the implement is automatically connected with the tractor in draft transmitting relation.

According to the principles of the present invention, new and improved means is provided for automatically guiding the jaws 41 and 42 into implement-receiving position by the backing of the tractor into the implement, and such means will now be described.

Referring first to Figs. 9–11, the crossbar 33, which forms a part of or is secured to the implement to facilitate its connection to the tractor, is provided at each end with an attaching stud 34. Each stud includes a tapered section 101 that leads from the main body of the crossbar 33 to a reduced section 102, there being a shoulder 103 between the reduced section 102 and the adjacent tapered portion 101. For receiving a tractor draft link, the reduced section 102 carries a spherical bearing member 104 that normally lies against the shoulder 103. The laterally outer face of the bearing member 104 is recessed annularly, as at 106, and the reduced section 102 extends laterally outwardly beyond the bearing member 104 and is provided with a cross bore 107 in which in pin 108 is adapted to be disposed. The laterally outer end of the reduced section 102 is tapered, as at 109.

A guide member 110 is mounted on the stud section 102 laterally outwardly of the bearing member 104 and, as shown in Figs. 9–11, comprises a conoidal member having a hub section 111 and a conical or outwardly flaring section 112 the latter forming the principal guiding means of the member 110. The hub section 111 is cylindrical and is provided at its inner end with an opening 113 to receive the pin 108, the inner end of the hub section being disposed in the annular groove or recess 106 in the bearing member 104. The central portion of the conical member 112 is provided with an inner cylindrical portion 116, the outer part of the section 116 and the outer part of the hub section 111 being apertured to receive a cotter pin 117 or other attaching means. As will be seen from Fig. 11, the inner portion of the member 112 overlies the pin 108 when the parts are assembled, thus holding the pin 108 against displacement. By removing the cotter pin 117 the member or part 112 may be slipped off the hub section 111, and then the pin 108 may be removed from the hub section 111 to free the latter, thus freeing the bearing member 104. It will be understood that this is not done except to replace broken or worn parts. Each end of the crossbar 33 carries a construction like that just described and when a tractor, carrying the links 22 and the two sets of jaws 41 and 42, is backed into the implement, if there should be some lateral displacement or misalignment, the tapered sections 112 will act to guide the links 22, which are laterally swingable, into a position to carry the bearing members 104, which form a part of the studs 34, into the open jaws 41 and 42. Further backing of the tractor toward the implement will cause the bearing members 104 to press against the intermediate portions of the jaws 41 and 42 to move the jaws into the links 22, which movement automatically causes the jaws to close about the bearing members 104. This action continues until the jaws 41 and 42 are fully closed. After the rear end of the upper link 21 (Fig. 1) is connected with the upper portion of the implement mast section 32, which may be done by any suitable means, the implement is then connected in draft transmitting relation with the tractor 20.

A modified form of the guide means of the present invention is shown in Fig. 12. In this form, the outwardly flaring or conical section 121 is mounted for axial movement on a cylindrical section 122 having a radially outwardly extending shoulder 123 against which a coiled spring 124 is disposed. An inner ring 125, which may form a part of the member 121, receives the inner end of the spring 124. The inner ends of the cylindrical section 122 is apertured, as described above, to receive the attaching or securing pin 108, and opposite portions of the conical member 121 is provided with openings 127 to permit the application of the pin 108 after which the spring 124 forces the ring member 125 over the ends of the pin 108 to hold the latter in position.

A further form of guide means is shown in Fig. 13. In this form the cylindrical section 131 and conical section 132 form integral portions of a single part, which may be a casting, forging or the like, the cylindrical section 131 having openings 134 to receive a cross pin 108, which is held in place by small pins 136 that are inserted through openings in the member 131, 132 after the latter have been mounted on the outer end of the stud reduced section 102 and the pin 108 placed in the aligned openings in the cylindrical sections 131 and the reduced portion 102 of the stud 34.

A modified construction of quick acting jaw coupler construction is shown in Fig. 6–8. In this form of the invention, the draft links 22a are provided with a chambered construction 141 that has an opening 142 facing downwardly. The side walls of the rear end of each of the links 22a is slotted, as at 143 and receives a pivot member 144 that connects upper and lower implement-receiving jaws 146 and 147. The jaws 146 and 147 are substantially like the jaws 41 and 42 described above except that the latch-receiving abutments 53a and 55a are at the lower side of the associated link 22a, adjacent the opening 142. The latch 150 employed in this form of the invention comprises a member pivotally mounted on the link 22a and disposed in the opening 142, the pivotal mounting being divided by means of a pin 151 carried by the rear end portion of the link 22a. The forward end of the link 150 is provided with a detent section 152 that is adapted to engage both abutments 53a and 55a. The end of the latch member 150 opposite the detent section 152 is provided with an apertured lug 154 to which a link 155 is connected in any suitable way. The link 155 extends from the lug 154 outwardly of the link 22 through a small bore 156 upwardly to an operating lever 157 that is pivotally mounted on a pin 158 that, in this form of the invention, connects a lift link 23a to the associated draft link 22a. The outer end portion 159 of the lever 157 is apertured to receive a cable 161 or suitable means whereby an operator may actuate the latch 150. A spring 162 has one end received in a recess 163 in the link 22a and acts against the lug 154 for the purpose of urging the latch 150 to its jaw-engaging position. An upward pull exerted on the cable 161 acts through the lever 157 and rod 155 to move the latch 150 into its jaw-releasing position. A lug 165 on the latch 150 limits the movement of the latch 150 under the action of the spring 162, similar to the latch 50 of which the part 66 limits the downward movement, as shown in Figure 4, for the purpose of facilitating reconnection of the retractable jaws with the associated latch.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A hitch device for connecting an implement having laterally spaced apart attaching studs to a tractor having a pair of laterally spaced apart laterally swingable draft links, said device including a pair of pivotally interconnected stud-engaging jaws slidably mounted on each of said links, and movable thereon between stud-holding and stud-releasing positions, means on each link forming jaw-engaging shoulders along which the associated jaws are movable into and out of a stud-holding position, and releasable means engageable with said jaws for holding them in stud-holding position between said shoulders.

2. A hitch device for connecting an implement having laterally spaced apart attaching studs to a tractor having a pair of laterally spaced apart, laterally swingable draft links, said device including a pair of pivotally interconnected stud-engaging jaws slidably mounted on each of said links, and movable thereon between stud-holding and stud-releasing positions, means on each link forming a pair of opposed shoulders engaging the associated jaws to prevent them from opening, a latch means carried by each link and releasably engaging each jaw of the associated pair of jaws to prevent them from moving along the associated link to a position in which the jaws are released from said shoulders, and means acting against said latch means to hold the latter in a jaw-releasing position after said latch means has been moved to said position.

3. In a hitch device for connecting an implement to a tractor, a jaw mounting part, a pair of pivotally interconnected jaws movably mounted on said part, a jaw engaging latch movably mounted on said part and having a jaw-engaging detent, said jaws being movable between open and closed positions, a latch-engaging part on each jaw, said latch-engaging parts being disposed, in one position of said jaws, so that both are engaged by said detent, and means on one of said jaws engageable with said latch for holding the latter in a jaw releasing position.

4. A hitch device for connecting an implement having laterally spaced apart attaching studs to a tractor having a pair of laterally spaced apart, laterally swingable draft links, said device including a pair of pivotally interconnected stud-engaging jaws slidably mounted on each of said links, and movable thereon between stud-holding and stud-releasing positions, means on each link forming a pair of opposed shoulders engaging the associated jaws to prevent them from opening, a latch means carried by each link and releasably engaging at least one jaw of the associated pair of jaws to prevent them from moving along the associated link to a position in which the jaws are released from said shoulders, and means acting against said latch means to hold the latter in jaw-releasing position after said latch means has been moved to said position.

5. In a hitch device for connecting an implement having laterally spaced apart attaching studs to a tractor having a pair of laterally spaced apart laterally swingable draft links, the combination of means on the rear end of each of said links providing a fore-and-aft extending hollow section, a pair of pivotally interconnected stud-engaging jaws slidably mounted in each of said sections, each pair of jaws having shouldered portions disposable within the associated hollow link section and serving when so disposed to prevent separation of the stud-engaging portions of said jaws, and releasable latch means carried by each link and engageable with at least one of the associated pair of jaws to hold the latter within said hollow section.

6. The invention set forth in claim 5, further characterized by said latch means including a portion extending into the associated hollow link section and at least one of said jaws having shoulder means to engage with said latch means.

7. The invention set forth in claim 5, further characterized by said jaws being shaped so that when the jaws are moved outwardly of the associated hollow link section, the application of a force directed against one of said jaws toward the associated link will move the jaws inwardly of said hollow section into a stud-engaging position.

8. The invention set forth in claim 7, further characterized by said jaws having stud-receiving abutment faces adapted to engage the associated studs when the tractor is backed into the implement.

9. In a hitch device for connecting an implement having laterally spaced apart attaching studs to a tractor having a pair of laterally spaced apart laterally swingable draft links, the combination of means on the rear end of each of said links providing a fore-and-aft extending hollow section having slotted side walls and an open rear end, a pair of stud-engaging jaws slidably mounted in each of said hollow link sections, a pivot pin pivotally interconnecting each pair of jaws and each pin extending through the slots in the associated side walls, said slots serving to limit the extension and retraction of said jaws, the latter having stud-encircling rear ends, spring means acting between said jaws to separate the rear ends thereof when the jaws are moved into their rearmost position, and said jaws having shouldered portions dimensioned to close said rear ends of the jaws when the latter are forced forwardly within the associated hollow link sections.

10. The invention set forth in claim 9, further characterized by a shoulder on the inner end of one jaw of each pair, and a controllable latch carried by each link and having a portion extending into the hollow section thereof to releasably engage said jaw shoulder.

11. The invention set forth in claim 9, further characterized by abutment faces on the rear ends of said jaws whereby backing the links into the implement studs, with said jaws in their open position, will close said jaws about said studs and thus connect the implement to the tractor.

12. The invention set forth in claim 9, further characterized by a hook-like part movably mounted within each hollow section and releasably engageable with the associated jaws for holding the latter in stud-engaging relation.

13. In a hitch device for connecting an implement to a tractor, a jaw mounting part, a pair of pivotally interconnected jaws movably mounted on said part, a jaw-engaging latch movably mounted on said part and having a jaw-engaging detent, said jaws being movable between open and closed positions, a latch-engaging part on each jaw, said latch-engaging parts being disposed, in one position of said jaws, so that both are engaged by said detent, means on one of said jaws engageable with said latch for holding the latter in a jaw-releasing position, means pivoting said latch on said mounting part, and said latch-engaging means on one of said jaws being movable directly therewith toward and away from said latch, whereby said latch-engaging means is operative only in one position of said jaws on said mounting part.

14. In a hitch device for connecting an implement to a tractor, a jaw-mounting part, a jaw-controlling latch, jaw means slidable on said mounting part and movable between open and closed positions relative to said part, means pivoting said latch on said part, and latch-engaging means mounted on and movable with said jaw means, said latch-engaging means comprising a spring engageable with said latch and operative, in one position of said jaw means on said mounting part, to releasably hold said latch in jaw-releasing position.

References Cited in the file of this patent

UNITED STATES PATENTS

| | | |
|---|---|---|
| 2,464,424 | Weldon et al. | Mar. 15, 1949 |
| 2,478,736 | Balzer | Aug. 9, 1949 |
| 2,591,916 | Caughman | Apr. 8, 1952 |
| 2,673,096 | Bendtsen | Mar. 23, 1954 |
| 2,673,507 | Sawyer | Mar. 30, 1954 |
| 2,674,169 | Sawyer | Apr. 6, 1954 |

FOREIGN PATENTS

| | | |
|---|---|---|
| 642,613 | Germany | Mar. 10, 1937 |
| 217,028 | Switzerland | Jan. 16, 1942 |